United States Patent [19]

Vozka et al.

[11] 4,104,363

[45] Aug. 1, 1978

[54] METHOD FOR PREPARATION OF PERFECTLY SPHERICAL PARTICLES OF SILICAGEL WITH CONTROLLED SIZE AND CONTROLLED PORE DIMENSIONS

[75] Inventors: Stanislav Vozka; Pavel Špaček; Miroslav Kubín, all of Prague, Czechoslovakia

[73] Assignee: Ceskoslovenska akademie ved, Prague, Czechoslovakia

[21] Appl. No.: 708,044

[22] Filed: Jul. 23, 1976

[30] Foreign Application Priority Data

Jul. 25, 1975 [CS] Czechoslovakia ............... 5256-75

[51] Int. Cl.² ........................................... C01B 33/16
[52] U.S. Cl. ................................. 423/338; 252/317; 252/448; 252/451
[58] Field of Search ............... 423/338; 252/448, 451, 252/317

[56] References Cited

U.S. PATENT DOCUMENTS

| | | | |
|---|---|---|---|
| 1,772,055 | 8/1930 | Miller et al. | 423/338 |
| 2,395,524 | 2/1946 | Weiser et al. | 423/338 X |
| 2,474,910 | 7/1949 | Pierce et al. | 252/317 X |
| 2,782,869 | 2/1957 | Gray | 423/338 X |
| 3,321,276 | 5/1967 | Burzynski et al. | 423/338 |
| 3,647,709 | 3/1972 | Hill | 252/451 X |
| 3,819,811 | 6/1974 | Aboutboul et al. | 423/338 |

*Primary Examiner*—Jack Cooper

[57] ABSTRACT

The invention relates to a method for preparation of perfectly spherical particles of silicagel with controlled particle size and controlled pore diameter, which are suitable as packings for high-speed liquid chromatography and gel permeation chromatography. Free liquid silicic acid is obtained by acidifying of solutions of alkaline metal silicates in organic solvents by organic acids miscible with water in the presence of higher amine as an emulsifier and polymerized to hydrogel in the form of spherical particles. These are isolated and partially hardened by heating above 100° C in a neutral organic medium, e.g. amyl acetate or dibutyl sebacate, to remove a part of water by distillation, then subjected to hydrothermal processing with water under pressure at a temperature above 150° C and eventually stabilized. Chromatographic beds of silicagel particles prepared in this way may be used both with aqueous and organic eluants and exhibit very low spreading of zones and high separation efficiency comparable with commercial styrene-divinyl-benzene gels.

2 Claims, No Drawings

METHOD FOR PREPARATION OF PERFECTLY SPHERICAL PARTICLES OF SILICAGEL WITH CONTROLLED SIZE AND CONTROLLED PORE DIMENSIONS

The invention relates to a method for preparation of perfectly spherical particles of silica with controlled particle size and controlled pore dimensions, which are applicable for high-pressure liquid chromatography and gel permeation chromatography.

Modern high-pressure liquid chromatography and particularly gel permeation chromatography (GPC) used for determination of molecular-weight distribution of polymers require perfect suppression of phenomena that lead to the spreading of sample zones in the column. This may be achieved by using as the column packing perfectly spherical particles of uniform size with high mechanical strength. Such material warrants the high homogeneity and stability of the chromatographic bed.

The sorbents for GPC must meet some additional requirements. In the first place, packings with various and well defined pore size have to be available, which exhibit a minimum sorption in order to guarantee a separation exclusively according to the size of separated molecules and which have to be thermally stable without limitation at temperatures around 130° C. The possibility to change eluants without formation, of inhomogeneities or without macroscopic volume changes of the chromatograhic bed is highly essential.

Materials based on polymers of silicic acid dehydrated to various stages (silicagels) fulfil the above requirements to a considerable degree. Even when sorption of chromatographed compounds may occur in some cases, this can be avoided, as a rule, by blocking the free silanol groups by means of various substituents. The considerable disadvantage of commercially available silicagel materials for GPC is a high degree of spreading of chromatographic zones in their application. This is because disintegrated material of ill-defined shape is used in chromatography causing a low homogeneity of packing. Not even those commercially available silicagel materials, that have particles of roughly spherical shape, give satisfactory results comparable to those obtained with organic styrene-divinylbenzene gels (Styragel). Rigid non-elastic materials, including silicagels, should have perfectly spherical particles with a smooth surface to enable one to prepare a perfectly homogeneous chromatographic bed of high separation efficiency.

The object of this invention is a method for preparation of perfectly spherical particles of silicagel with controlled size and controlled pore dimensions by polymerization of a free liquid silicic acid, obtained by acidifying of solutions of alkali metal silicates in an organic solvent, e.g. hexane or a mixture hexane-tetrachloromethane, wherein the aforesaid acidifying is carried out with a water-miscible organic acid, advantageously acetic or formic acid, and a higher amine, e.g. octadecylamine, is used as an emulsifier, and wherein the resulting hydrogel is then isolated in the form of spherical particles, preferably by filtration or centrifugation. The hydrogel thus formed is partially hardened by heating above 100° C in a medium of neutral organic solvent, advantageously in amyl acetate or in dibutyl sebacate, in order to partially remove water from the hydrogel by distillation. A method according to this invention is further characterized by the fact that the hardened gel is treated with water at a temperature above 150° C and at a pressure corresponding to the water vapour pressure at the applied temperature to obtain the gel of required porosity.

A method according to the invention allows one to prepare perfectly spherical particles of silicagel with a narrow distribution of particle size and with controlled pore size. The mean particle diameter can be varied from 2 $\mu$m to several hundreds of $\mu$m. Columns packed with this material exhibit a high number of theoretical plates comparable with that of commercial columns of Waters Associates (Framingham, Mass.), that are packed with the styrene-divinylbenzene gel (Styragel). The packings may be used in chromatography with aqueous and non-aqueous media and solvents can be changed at will without the necessity of repacking of the column. The dry-packing method can be used with advantage. This manufacturing procedure for silicagel is simple and unpretentious. Most of the chemicals used in the manufacturing may be easily recovered.

The preparation itself proceeds in the following four successive stages: preparation of the primary hydrogel, its partial hardening, the hydrothermal processing to the required porosity, and, eventually, drying and final hardening at the high temperature (stabilization of the structure).

In special cases it is not necessary to include all these stages in the preparation (cf. Examples).

Preparation of the Primary Hydrogel

The hyrogel is prepared by a suspension polymerization of silicic acid which is advantageously accelerated by heat. The solution of silicic acid may contain inorganic or organic salts which improve the mechanical properties of the product — the primary hydrogel. A mixture of organic liquids which are immiscible (or only partially miscible) with the solution of silicic acid is used as suspension medium. Mixtures of density close to the density of silicic acid solution are preferred. Higher aliphatic amines are used as emulsifiers. The particle size may be controlled by the speed of the stirrer and, to a certain degree, also by the concentration of emulsifier.

Preliminary Hardening of Gel

A part of the water in the primary hydrogel is first replaced by a liquid with higher boiling temperature than water, for example by organic esters (advantageously amyl acetate, dibutyl sebacate), glycols, glycerol, phosphoric acid, and the like. The choice of solvent is essentially arbitrary, the only requirement being that neither the solvent nor its respective products of thermal degradation react, at the temperature employed, with the processed silicagel to produce destructive effects.

The suspension of the gel in a suitable liquid is heated above 100° C in a distillation flask. Hardening of the originally elastic and soft hydrogel takes place during this procedure. This is accompanied by a smaller volume contraction than in the application of other procedures (e.g. drying in air).

Hydrothermal Processing

The hydrothermal processing is the action of water on silicagel at high temperatures and pressures. The original gel is thermodynamically unstable under these conditions and tends to a local rearrangement of its mass. The formation of a more stable form is characterized by the decrease of surface area of the gel. In this way, the average pore size increases while the total volume of gel remains unchanged.

Final Hardening

Several successive heatings of the gel to the temperature 300° – 900° C alternated with boiling of the gel in water lead to the physical as well as chemical stabilization of the gel: the structure is definitively stabilized together with the amount of silanol groups on the gel surface which may range between 1 and 95% of hydroxyls corresponding theoretically to the linear polymeric silicic acid.

The invention is illustrated by the following examples which however by no means limit the scope of the invention.

EXAMPLE 1

Commercial water glass (supplied by DRUCHEMA, density 36° – 38° Bé, PN 23/68, JK 214 982 018 18) (a Czechoslovak State Standard Code) was diluted with distilled water in the ratio 2 : 5. To 50 ml of the solution formed, there was added 2.75 ml of glacial acetic acid (analytical grade). The mixture was immediately poured into 120 ml of a mixture chloroform - hexane (1 : 1) which contained 0.2 g of octadecylamine previously dissolved. The emulsion was intensively agitated in a round-bottomed flask (800 r.p.m.) for 15 minutes at 50° C. The resulting hydrogel was isolated by filtration, dispersed in 200 ml of acetic anhydride and heated under reflux for 1 hour. The hydrophobic gel was rinsed with silicone oil and then heated in silicone oil for 2 hours at the temperature 200° C. The resulting product was washed several times with hexane and dried first at the ambient temperature and then in an oven at 200° C.

The final product consisted of spherical particles of silicagel of the size 20 – 70 μm (80%). The particles had a hydrophobic character and were used with success for the gel permeation chromatography in THF. The molecular weight exclusion limit was determined using polystyrene as the testing substance and corresponded to polystyrene of molecular weight 300,000. The column packed with a non-classified gel (i.e., a gel used without being classified according to particle size) exhibited 1500 theoretical plates (TP) per 1 m in THF for toluene as a testing compound. The column used had inner diameter 0.8 cm and length 90 cm. The solvent flow-rate was 1 ml/min.

EXAMPLE 2

Commercial water glass as in Example 1 (135 ml) was diluted with 270 ml of distilled water. Into the solution, there were successively added with stirring 27 ml of glacial acetic acid (analytical grade) and 12 g KCl (analytical grade) dissolved in 35 ml of distilled water heated to about 35° C. The resulting mixture was filtered by suction and then dispersed in 600 ml of the mixture tetrachloromethanehexane 1 : 2. Beforehand, 0.8 g of octadecylamine was dissolved in the organic phase. The emulsion was heated for 15 min to 50° C with rapid stirring (1000 r.p.m.) in a round-bottomed flask. The formed hydrogel was filtered from the organic phase and then washed several times with water containing disodium hydrogen phosphate ($Na_2HPO_4.12H_2O$). The suspension was finally washed with distilled water. Hexane and tetrachloromethane were recovered from the organic phase by distillation. The hydrogel was then three times washed with acetone, dispersed in dibutyl sebacate and heated in a distillation flask gradually to the temperature 230° C. The gel was cooled and washed several times with acetone and distilled water. Silicagel processed in this way was heated in an autoclave with the amount of water corresponding to twice the loose volume of gel for 8 hours at the temperature 300° C.

The final product consisted of macroporous spherical particles of silicagel of the size 30 – 70 μm (80%). This material was applied with good results in gel permeation chromatography in aqueous solution and in tetrahydrofuran. The separation range was $10^4$ to $10^7$ units of mol. weight for polystyrene in THF. The column packed with the gel fraction of 30 – 100 μm size (length 90 cm, diameter 0.8 cm) exhibited 2800 TP/m for toluene as the solute and tetrahydrofuran as the mobile phase.

EXAMPLE 3

Commercial water glass (cf. Example 1; 170 ml) was diluted with 420 ml of distilled water and cooled in a mixture water - ice. To the sufficiently cooled solution, there was added with stirring 60 ml of glacial acetic acid (analytical grade) and then 25 g of KCl dissolved in 70 ml of (35° C) water. The solution was filtered by suction and immediately dispersed in the mixture of 200 ml of tetrachloromethane and 600 ml of petroleum fraction (distillation range 60° – 80° C) which contained 1.6 g of dissolved octadecylamine. The mixture was heated to 50° C in a round-bottomed flask and intensively agitated (1000 r.p.m.) for 20 minutes. The resulting gel was isolated and washed with acetone and distilled water. The organic solvents were recovered by distillation. The hydrogel was dispersed in hydrochloric acid (10 times diluted 36% HCl, analytical grade) and allowed to stand for 2 hours. Then it was washed with distilled water and stirred into a solution containing such amount of sodium hydrogen carbonate as to achieve a weak basic reaction of the mixture. The gel was left in this solution overnight and then washed several times with water and then with acetone. The product washed with acetone was transfered into amyl acetate and heated in a distillation flask until all acetone and water distilled off (at a temperature below 140° C). Silicagel processed in this way was washed several times with ethanol and distilled water. Amyl acetate was recovered from the distillate by washing with water (to remove a part of the acetone dissolved) and distillation. The gel was dried in an oven at 200° C. The dry product was dispersed in diluted hydrochloric acid (five times diluted 36% HCl, analytical grade) and kept in this solution for 2 hours at the temperature 80° C. It was then washed with distilled water and dried in a furnace at 450° C for 4 hours. The dried gel was transfered into distilled water and heated to 100° C. The latter cycle was repeated three times.

The final product consisted of perfectly spherical particles of gel of the size 30 – 60 μm (80%) which are suitable for chromatography in both aqueous and organic solutions. The gel was able to separate polystyrene in THF by molecular weight in the region $10^3 - 5 \times 10^4$. In aqueous solutions, the gel prepared in this way separated dextran fractions up to the molecular weight 70,000. The gel packed in a column of 90 cm length and 0.8 cm in diameter exhibited 4000 TP/m. It was found out by means of mercury porosimetry that the gel had a narrow distribution of pore sizes. The average diameter of pores was 95 Å and the total free volume of pores amounted to 80%.

EXAMPLE 4

The gel prepared according to Example 3 was heated, after processing in amyl acetate and washing with ethanol and distilled water, in an autoclave for 8 hours to 220° C with the amount of water corresponding to twice its loose volume. After this processing, the gel was stirred into diluted hydrochloric acid (5 times diluted 36% HCl, analytical grade) and left in the solution for 2 hours at the temperature 80° C. It was then washed with water and dried at 450° C for 6 hr. The obtained material was heated in distilled water to boiling. The latter cycle was repeated three times.

The final product consisted of perfectly spherical particles of silicagel of size 30 – 60 μm (80%) suitable for chromatography both in water and organic solvents. The gel separated according to mol. weight in THF in the range $5 \times 10^3 - 5 \times 10^5$. Dextran fractions were separated in water on this gel in the range $1 \times 10^4 - 1 \times 10^6$. For toluene in THF (1 ml/min), separation efficiency of 5300 TP/m was found in a column of 90 cm length and 0.8 cm diameter. The fraction 30 – 60 μm was used for packing of this column. For n-propanol in water, 3500 TP/m was found under the same conditions. Mercury porosimetry showed a very narrow distribution of pore sizes in the gel ($\bar{r}$ = 250 Å). The total free volume of pores amounted to 80%.

EXAMPLE 5

Silicagel was treated in the same way as in Example 4, only the temperature in autoclave was 250° C.

The final product consisted of perfectly spherical particles (80% between 30 and 60 μm) of silicagel with a narrow distribution of size, which were suitable for chromatography both in aqueous and organic media. The separation power according to molecular weights was $1 \times 10^4 - 1 \times 10^6$ units of mol. weight for polystyrene in THF. A distinct separation by molecular weight was observed even with the highest fraction used, which had the average molecular weight $2 \times 10^6$. For the column packed with a gel of particle size 30 – 100 μm (column length 90 cm, diameter 0.8 cm), there was found 3800 TP/m for toluene as the testing substance in THF. The same column gave 3300 TP/m for n-propanol in water (1 ml/min). A very narrow distribution of pore sizes with the average radius 330 Å was found by mercury porosimetry. The total volume of pores in the gel was 75%.

EXAMPLE 6

Commercial water glass (cf. Example 1, 255 ml) was mixed with 630 ml of distilled water and cooled to the temperature 0° C. Into this solution, there were added 90 ml of glacial acetic acid (analytical grade) and 37.5 g KCl dissolved in 105 ml of distilled water (35° C). The solution was filtered by suction and dispersed in a mixture of 200 ml of tetrachloromethane and 600 ml of cyclohexane. The organic phase contained 2.7 g of octadecylamine previously dissolved. The mixture was intensively stirred (1500 r.p.m.) in a round-bottomed flask for 20 minutes at 50° C. The obtained hydrogel was further processed in the same way as in Example 3.

The final product consisted of perfectly spherical particles of silicagel of the size 3 – 30 μm (80% of particles). They were used, after fractionation according to size, for packing of microcolumns for high-speed liquid chromatography. The column packed with the fraction of particle size around 20 μm (column length 30 cm, $r$ = 2 mm) exhibited 32,000 TP/m for toluene in heptane (flow rate 0.2 ml/min).

We claim:
1. A method of preparing perfectly spherical particles of silicagel with controlled particle size and with controlled pore dimensions comprising the following steps:
   A. preparation of a hydrogel by:
      (1) acidifying a solution of an alkali metal silicate by an organic acid miscible with water;
      (2) emulsifying said solution in a combination of organic liquids which is selected from the group consisting of chloroform-hexane, tetrachloromethane-hexane, tetrachloromethane-cyclohexane, and tetrachloromethane-petroleum fraction; said fraction having a distillation range of 60° – 80° C. in the presence of octadecylamine;
      (3) agitating the emulsion until a silica hydrogel is formed;
   B. preliminary hardening of said hydrogel by heating above 100° C. a suspension of the hydrogel in a liquid boiling above 100° C., said liquid being selected from the group consisting of amyl acetate, dibutyl sebacate, glycol, glycerol, and phosphoric acid;
   C. hydrothermal processing of the hardened hydrogel by heating same with water in an autoclave at 150° C. to 300° C. at a pressure corresponding to the vapor pressure of water at the temperature used; and
   D. final hardening of the gel by:
      (1) heating of the gel at 300° – 900° C.;
      (2) boiling the gel in water; and
      (3) repeating steps D(1) and (2) three times.
2. The method of claim 1 wherein an organic acid selected from the group consisting of acetic acid and formic acid is used in acidification step A(2).

* * * * *